(12) United States Patent
Powell et al.

(10) Patent No.: US 12,066,096 B2
(45) Date of Patent: Aug. 20, 2024

(54) SYSTEMS FOR DIFFERENTIAL ASSEMBLY

(71) Applicant: Dana Automotive Systems Group, LLC, Maumee, OH (US)

(72) Inventors: Benjamin Powell, Austin, TX (US); Ryan D. Nelms, Weatherford, TX (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 1 day.

(21) Appl. No.: 17/823,453

(22) Filed: Aug. 30, 2022

(65) Prior Publication Data
US 2024/0068556 A1 Feb. 29, 2024

(51) Int. Cl.
F16H 57/08 (2006.01)
F16H 57/023 (2012.01)
F16H 57/037 (2012.01)

(52) U.S. Cl.
CPC ......... F16H 57/082 (2013.01); F16H 57/023 (2013.01); F16H 57/037 (2013.01)

(58) Field of Classification Search
CPC ..... F16H 57/082; F16H 57/023; F16H 57/037
USPC ........................................................ 475/331
See application file for complete search history.

(56) References Cited

U.S. PATENT DOCUMENTS

| | | | | |
|---|---|---|---|---|
| 3,280,363 A | * | 10/1966 | Benjamin | H04N 3/24 348/E3.047 |
| 3,408,605 A | * | 10/1968 | Benjamin | H01F 38/42 336/205 |
| 5,609,542 A | * | 3/1997 | Kusumoto | F16H 57/082 475/331 |
| 5,649,879 A | * | 7/1997 | Kusumoto | F02N 15/046 475/346 |
| 7,389,708 B2 | * | 6/2008 | Kajino | F02N 15/046 74/7 E |
| 2004/0187615 A1 | * | 9/2004 | Murata | F02N 15/023 74/7 E |
| 2007/0010365 A1 | * | 1/2007 | Schmitt | F16H 57/0479 475/159 |
| 2010/0329868 A1 | | 12/2010 | Ben et al. | |
| 2012/0017723 A1 | | 1/2012 | Makulec et al. | |
| 2012/0316027 A1 | * | 12/2012 | Erno | F16H 57/082 475/331 |
| 2014/0041981 A1 | | 2/2014 | Flora et al. | |
| 2014/0179481 A1 | * | 6/2014 | Fox | F16H 48/40 475/220 |
| 2017/0023125 A1 | | 1/2017 | Diekhans | |
| 2018/0246446 A1 | * | 8/2018 | Miyawaki | G03G 15/2053 |

FOREIGN PATENT DOCUMENTS

CN 214197204 U 9/2021

* cited by examiner

Primary Examiner — Colby M Hansen
(74) Attorney, Agent, or Firm — McCoy Russell LLP

(57) ABSTRACT

Systems are provided for a differential carrier assembly for a vehicle. In one example, a system includes a planet carrier coupled to a differential carrier and a planet carrier comprising a plurality of planet shafts including a cutout interfacing with a pilot interface of the differential carrier.

18 Claims, 5 Drawing Sheets

SYSTEMS FOR DIFFERENTIAL ASSEMBLY

TECHNICAL FIELD

The present description relates generally to a differential assembly in a vehicle.

BACKGROUND AND SUMMARY

Axle assemblies are adapted to transmit rotational power from an engine and/or an electric motor of a vehicle to the wheels thereof. Typically, an axle assembly includes a differential assembly that is rotatably supported within a non-rotating housing (e.g., carrier). The differential is connected between an input drive shaft extending from the vehicle engine/transmission and a pair of output axle shafts extending to the vehicle wheels. The axle shafts are contained in respective non-rotating beam housing portions (e.g., axle tubes), which are secured to a central housing. Thus, rotation of the differential by the drive shaft causes corresponding rotation of the axle shafts. The central housing and the beam housing portions form an axle housing for these drive train components of the axle assembly, with the differential and the axle shafts supported for rotation therein.

A planetary gear set may be used to control power transfer from the motor to the axle assembly. The planetary gear set may include planet shafts on which the planet gears are arranged. The planet shafts may be kept stationary via a snap ring or other element.

The inventors have realized some issues with the assemblies described above. For example, the snap ring or other element introduces increased manufacturing costs and complexities. Furthermore, the snap ring may introduce a weak point and may require additional maintenance, which may decrease customer satisfaction.

In one example, the issues described above may be addressed by a system including a planet carrier coupled to a differential carrier and a planet carrier comprising a plurality of planet shafts including a cutout interfacing with a pilot interface of the differential carrier. In this way, inclusion of a snap ring or additional element to fixedly hold the plurality of planet shafts in place may be omitted. By doing this, a manufacturing cost and complexity may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION

Figure 1:
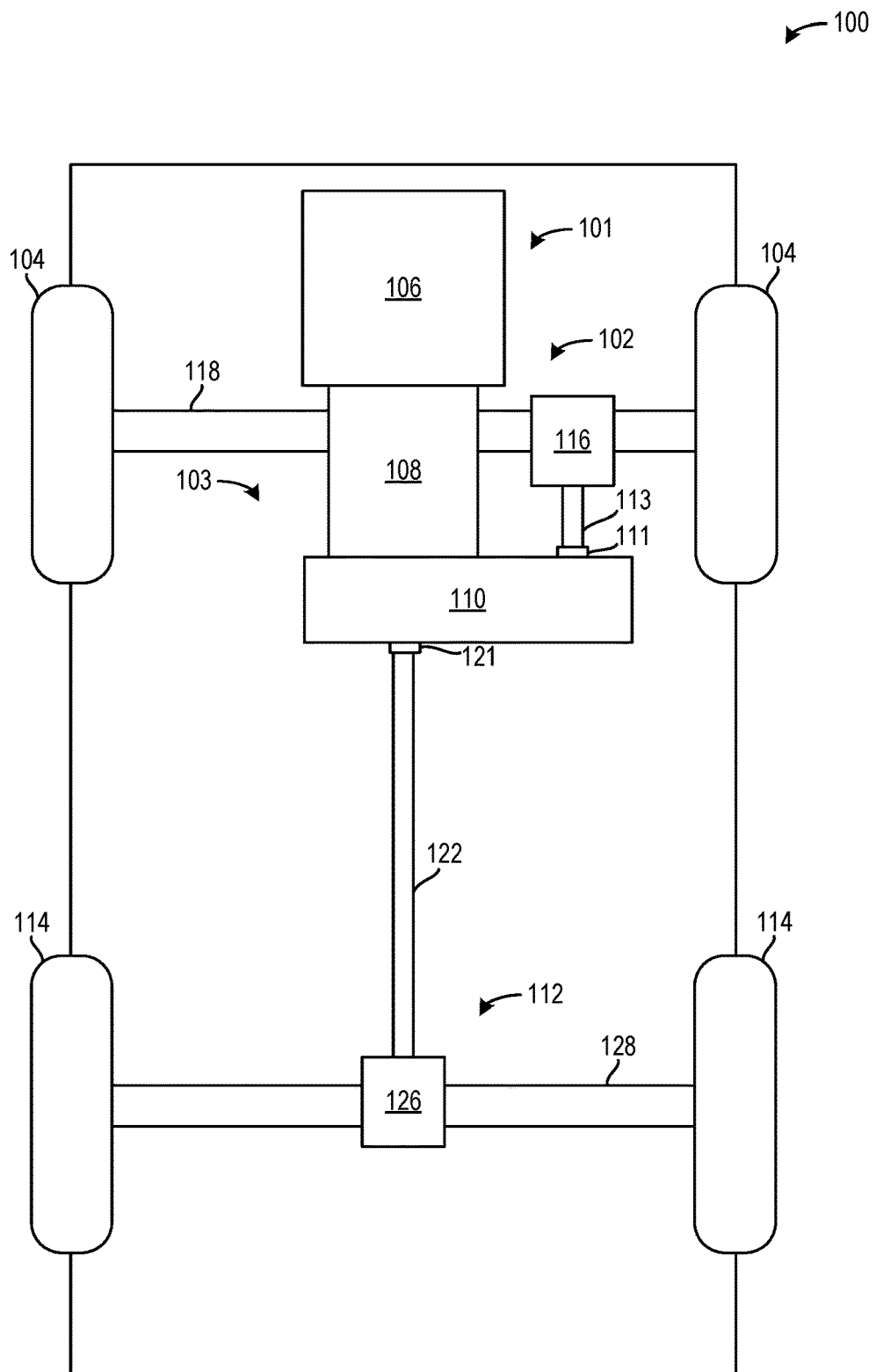
FIG. 1 is a schematic depiction of an example vehicle powertrain.
Figure 2:
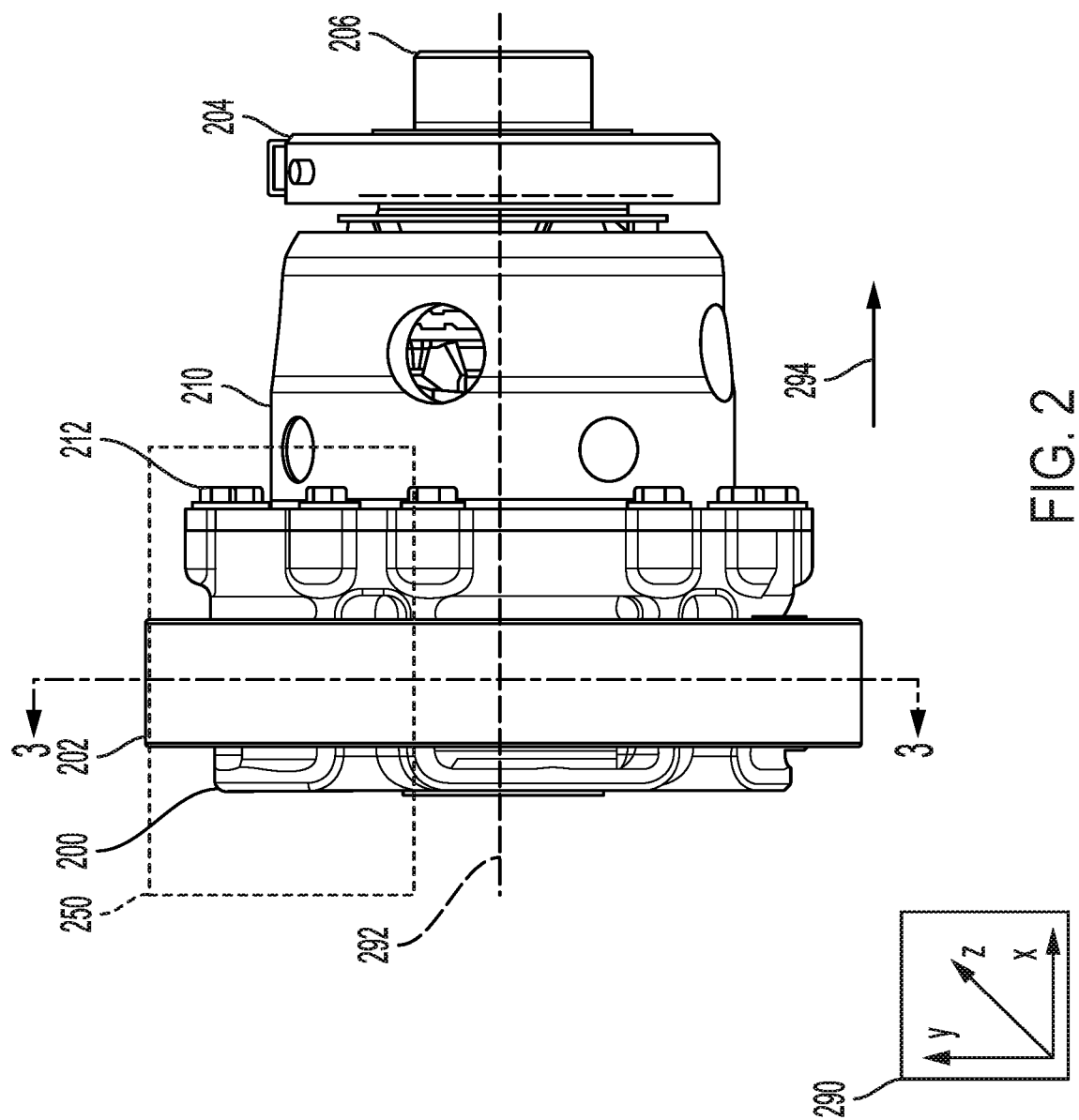
FIG. 2 is a side-on view of a differential carrier assembly.
Figure 3:
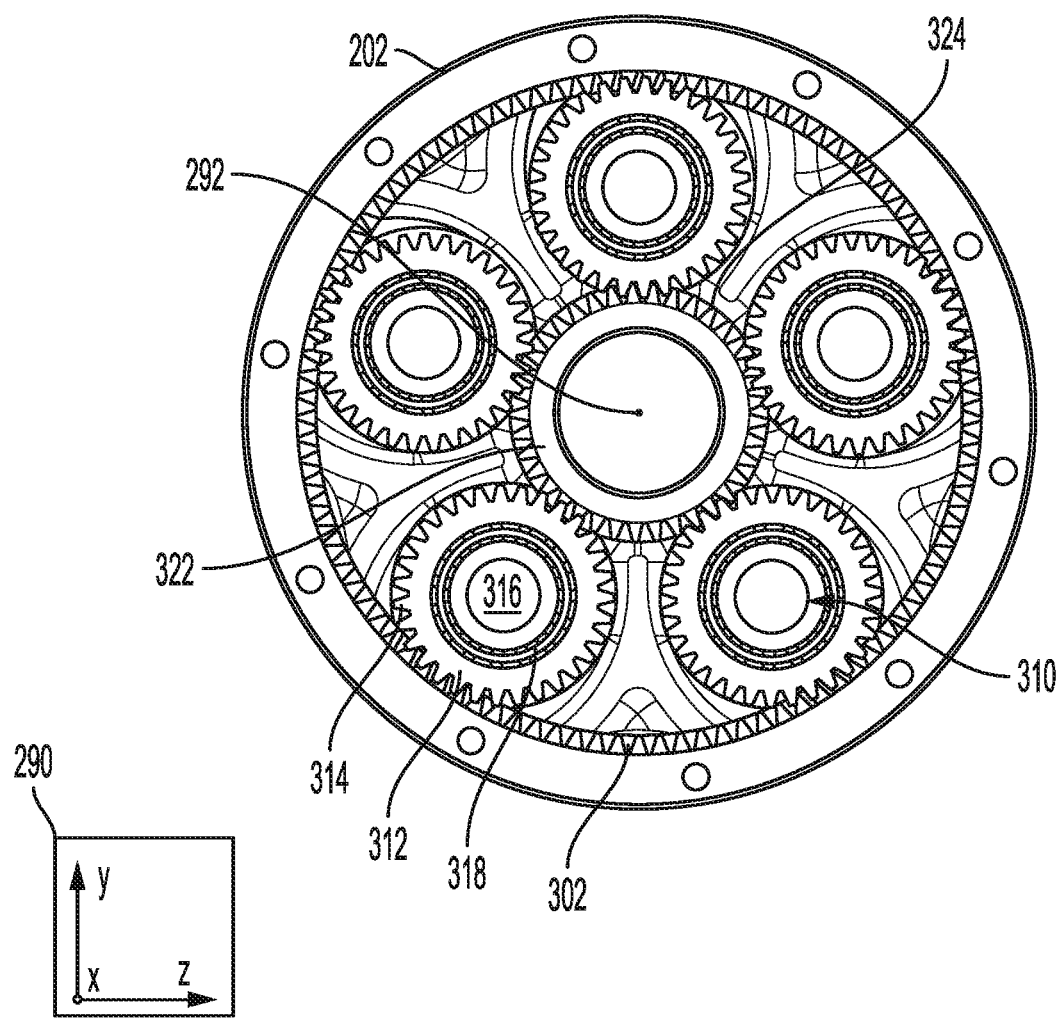
FIG. 3 is a first cross-sectional view of the differential carrier assembly along cutting plane 3-3.
Figure 4:
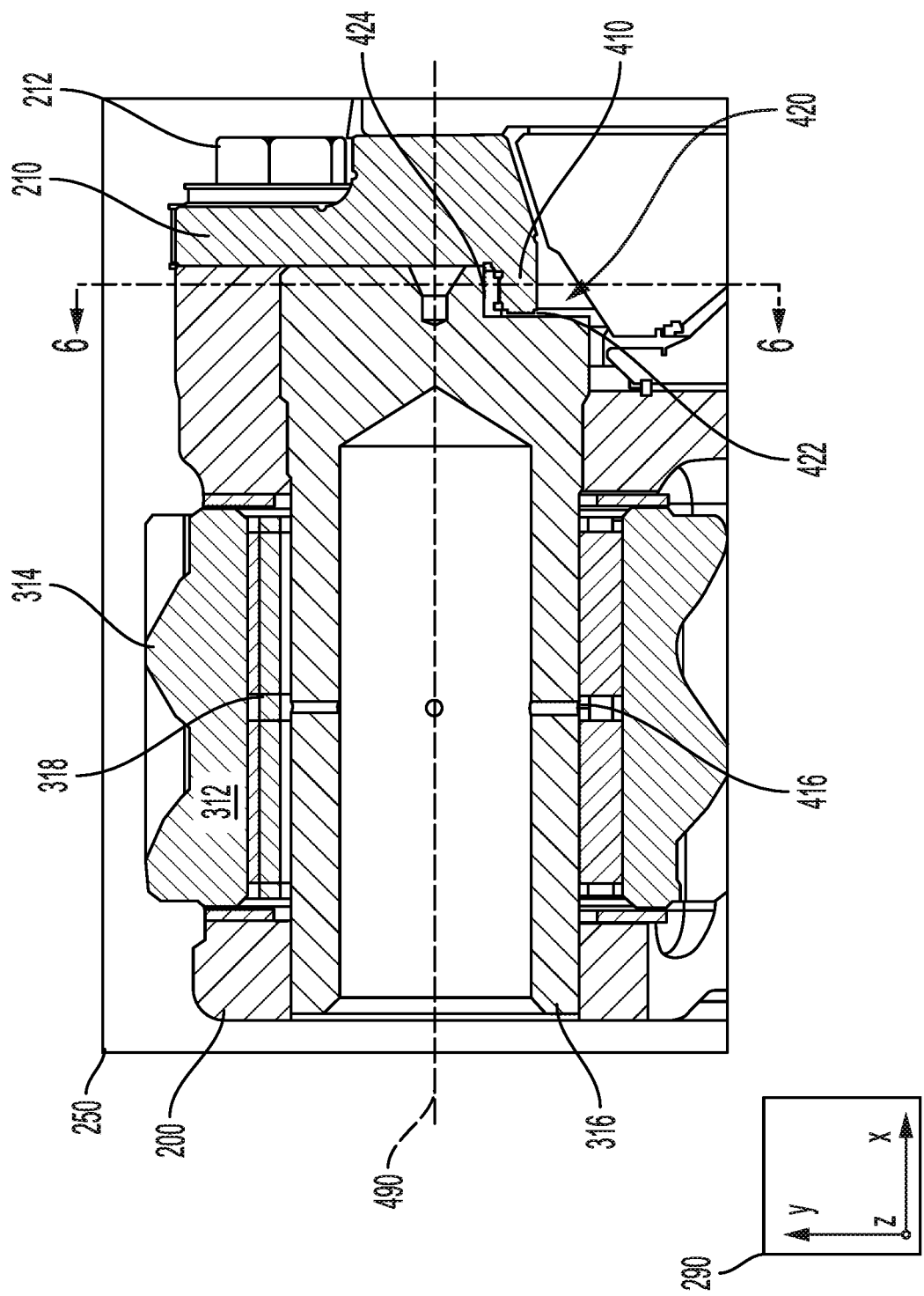
FIG. 4 is a view of a planet shaft interfacing with a differential carrier and a planet gear.
Figure 5:
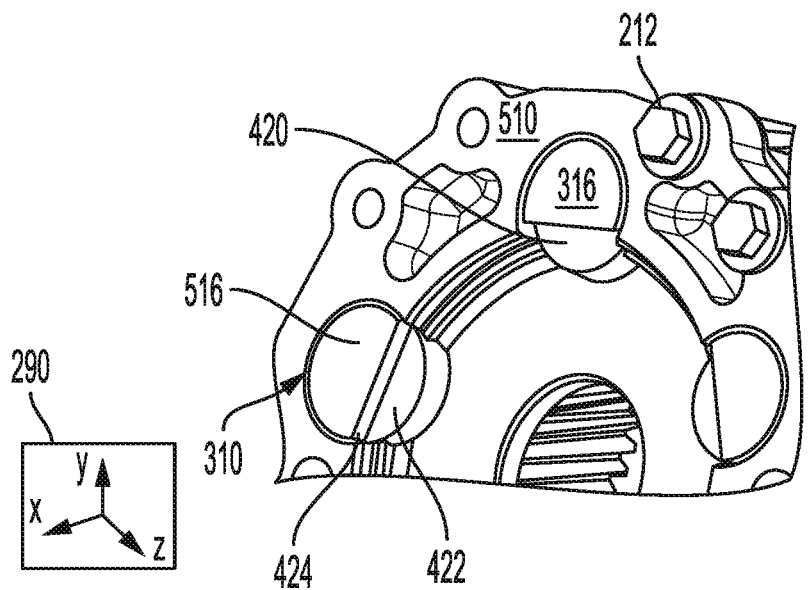
FIG. 5 is a view of a surface and an extreme end of the planet shaft along with a cutout thereof.
Figure 6:
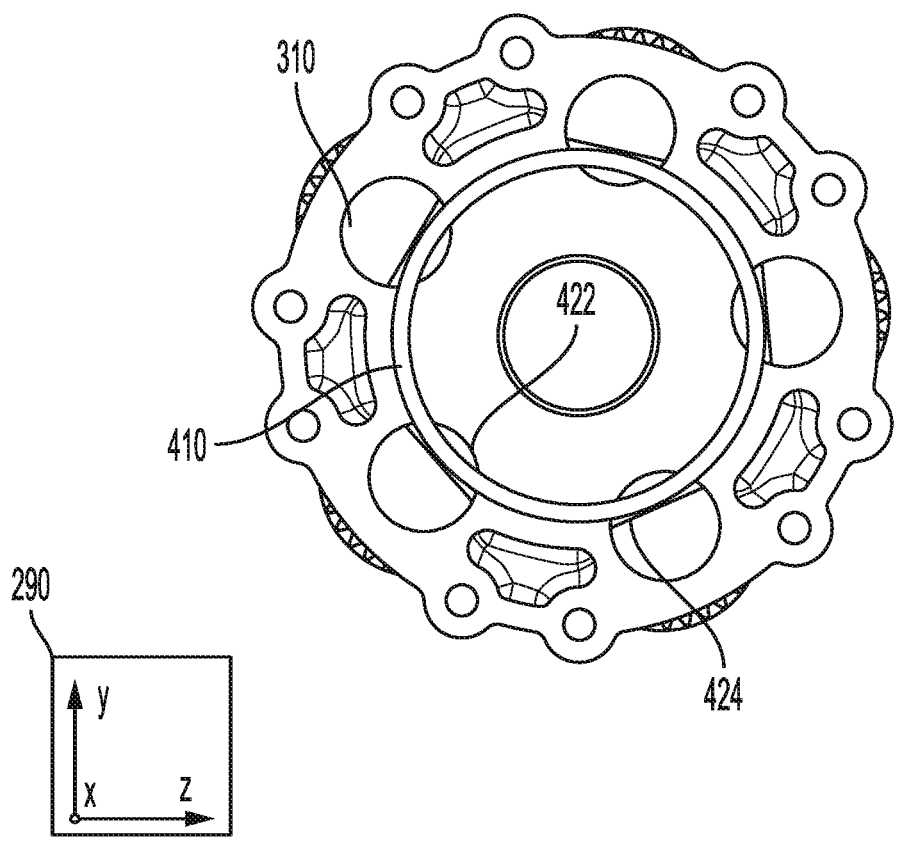
FIG. 6 is a second cross-sectional view showing a pilot interface of the differential carrier with the cutout.

The following description relates to a system for an axle assembly in a vehicle. For example, the vehicle may be propelled by a powertrain, such as illustrated in FIG. 1. FIG. 2 shows a side-on view of a differential carrier assembly. FIG. 3 shows a first cross-sectional view of the differential carrier assembly along cutting plane 3-3. FIG. 4 shows a view of a planet shaft interfacing with a differential carrier and a planet gear. FIG. 5 shows a view of a surface and an extreme end of the planet shaft along with a cutout thereof. FIG. 6 shows a second cross-sectional view showing a pilot interface of the differential carrier with the cutout.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). FIGS. 2-6 are drawn to scale, however, other relative dimensions may be used.

Turning now to FIG. 1, a vehicle 100 is shown comprising a powertrain 101 and a drivetrain 103. The powertrain comprises a prime mover 106 and a transmission 108. The prime mover 106 may be an internal combustion engine or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing. An embodiment of an axle assembly will be described in more detail below with respect to FIGS. 2-3C In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

FIGS. 2-6 include reference axes 290 including an x-axis parallel to a horizontal direction, a y-axis parallel to a vertical direction, and a z-axis normal to each of the x- and y-axes.

Turning now to FIG. 2, it shows a planetary carrier 200 coupled to a differential carrier 210. A planetary ring gear 202 may surround the planetary carrier 200 and transfer power to a gear set extending from the planetary carrier 200 to the differential carrier 210. The differential carrier 210 may be physically coupled to the planetary carrier 200 via a plurality of fasteners 212. The differential carrier 210 may seal a pilot opening of the planetary carrier 200 via face-sharing contact therebetween. An electronic differential lock (EDL) 204, arranged between the differential carrier 210 and a bearing interface 206, may press against and lock a side gear to the differential carrier 210. The side gear may be a gear of an internal gearset of the differential carrier 210. The internal gearset may transmit power to wheels of a vehicle, such as vehicle 100 of FIG. 1. A central axis 292 may be a composite axis from differential carrier 210 and the planetary carrier 200. The central axis 292 may be parallel to the x-axis. An assembly direction 294 in which the gear set extends may be parallel to the x-axis. In one example, the gear set is a planetary gear set.

Cutting plane 3-3 illustrates a cutting direction parallel to an x-y plane illustrating the planetary ring gear 202 and gears of the gear set radially interior thereto revealed and illustrated in FIG. 3. Dashed box 250 illustrates a window in which an interior of the planetary carrier 200 and the differential carrier 210 is revealed and illustrated in FIG. 4.

Turning now to FIG. 3, it shows an example of the planetary ring gear 202. As such, components previously introduced are similarly numbered in this and subsequent figures. The planetary ring gear 202 may include a plurality of gear teeth 302 configured to engage with planet gear teeth 314 of planet gears 312 of the planetary gear set. Each of the plurality of clutch ring teeth 302 may insert into a gap arranged between adjacent teeth of the planet gear teeth 314. Motion of the planetary ring gear 202 may result in motion of one or more of the planet gears 312.

The planet gear teeth 314 may further engage with sun teeth 324 of a sun gear 322. Each of the planet gear teeth 314 may insert into a gap arranged between adjacent teeth of the sun teeth 324. Rotation of one or more of the planet gears 312 may result in motion of the sun gear 322, which may rotate a shaft, such as differential side gears of FIG. 2.

Each of the planet gears 312 may be arranged on a corresponding planet shaft 316 of a plurality of planet shafts 310. Each of the plurality of planet shafts 310 may be identical to one another in size and shape. A planet bearing 318 may be arranged between the planet shaft 316 and a planet gear of the planet gears 312. As will be described herein, the planet shaft 316 may be stationary. Thus, the planet shaft 316 may not rotate as the planet gears 312 rotate.

Turning now to FIG. 4, it shows an interior view of the planet shaft 316, a planet gear of the planet gears 312, and the planetary carrier 200 according to the dashed box 250. Each planet shaft 316 may include a plurality of radial channels 416. An interior of the planet shaft 316 may include a passage fluidly coupled to the plurality of radial channels 416. The plurality of radial channels 416 may direct lubricant to an interior race of the planet bearings 318.

The planet shaft 316 may include a feature 420. The feature 420 may be a cutout at an extreme end of the planet shaft 316 proximal to an opening of the planetary carrier 200 to which the differential carrier 210 is coupled. The feature 420 may be interchangeably referred to as cutout 420 herein. The feature 420 may be a notch, a depression, a stepcut, or other deviation that results in a reduction of a diameter of the planet shaft 316 near the extreme end. The feature 420 may include a radial surface 422 and an axial surface 424 normal to the radial surface 422. Each of the planet shafts 310 may include the feature 420. The feature 420 is shown in greater detail with respect to FIG. 5. While FIG. 4 illustrates a corner interface between the radial surface 422 and the axial surface 424, the interface between the radial surface 422 and the axial surface 424 may be rounded in some examples.

The radial surface 422 may not extend to a central axis 490 of the planet shaft 316. As such, a length of the radial surface 422 is less than a radius of the planet shaft 316. A length of the axial surface 424 may be less than a length of the planet shaft 316. In one embodiment, the length of the radial surface 422 is greater than the length of the axial surface 424. In some embodiments, additionally or alternatively, the length of the radial surface may be less than or equal to the length of the axial surface 424. In one example, the axial surface 424 and the radial surface 422 do not extend to a location of the planet shaft 316 which interfaces with the bearing 318 and the planet gear 312.

The portions of the planet shaft 316 spaced away from the feature 420 may be flush with a surface of the planetary carrier 200. The differential carrier 210 may be pressed against each of the surface and an entirety of the extreme end of the planet shaft 316. The differential carrier may include a pilot interface 410 extending further toward an interior of the planetary carrier 200 relative to other portions of the differential carrier 210. The pilot interface 410 is pressed against the feature 420. Herein, the pilot interface 410 may be referred to as protrusion 410. The protrusion 410 may be pressed against one or more of the radial surface 422 and the axial surface 424. In one example, the protrusion 410 is pressed against both the radial surface 422 and the axial surface 424. In some embodiments, the protrusion 410 may be pressed against a portion of the radial surface 422 and an entirety of the axial surface 424. The differential carrier 210 does not contact the planet gears 312.

The protrusion 410 may include a square cross-sectional shape along a x-z plane. In one example, corners of the protrusion 410 may be rounded. The protrusion 410 may include various compressive features for sealing the planetary carrier 200, in some examples.

Turning now to FIG. 5, it shows a perspective view of the feature 420. The feature 420 may be arranged adjacent to a diameter of the planet shafts 310 closest to a central axis of the differential carrier (e.g., central axis 292 and planetary carrier 200 of FIG. 2, respectively). In one example, the axial surface 424 faces a radially interior direction and the radial surface 422 faces an axially outward direction parallel to the direction of assembly (e.g., direction of assembly 294 of FIG. 2).

A surface 510 of the planetary carrier 200 is shown. As mentioned above, the differential carrier (e.g., differential carrier 210) is pressed against each of the surface 510, an end surface 516 of the planet shafts 310, the radial surface 422, and the axial surface 424. The end surface 516 corresponds to a portion of the planet shafts that follow a preceding shape of the planet shaft 316 and do not adjust a diameter thereof. Said another way, the end surface 516 may comprise an arc length corresponding to a circle with a diameter identical to a diameter of the portions of the planet shafts 310 where the feature 420 is not located.

The feature 420 may include a half-circle shape or a half-oval shape. In some embodiments, the feature 420 may include other shapes, such as triangular, pentagonal, trapezoidal, double D cut-out, an arc, a semicircle, and the like. The feature 420 may include various interlocking elements, such as teeth, indentations, recesses, protrusions, and the like, configured to engage with complementary features of the protrusion (e.g., protrusion 410). The feature 420 may include guiding elements to assist in an assembly process of the differential carrier assembly, the assembly including the entirety of the planetary carrier 200 and the differential carrier 210.

In some embodiments, the protrusion 410 may be an internal pilot feature (as illustrated) or an external pilot feature. The external pilot feature may include increasing a diameter of the protrusion 410 such that it engages with an outer diameter of the planet shafts 310. In such an example, the feature 420 may be located on the outer diameter of the planet shafts 310.

Turning now to FIG. 6, it shows a cross-sectional view taken along cutting plane 6-6 of FIG. 4. The protrusion 410 is engaged with and in face-sharing contact with features of each of the plurality of planet shafts 310. In one example, the protrusion 410 is a single, continuous protrusion comprising a circular cross-sectional shape along the cutting plane 6-6. The protrusion 410 may resist motion of the planet shafts 310 via pressing against each of the radial surface 422 and the axial surface 424 when the planet shaft 316 attempts to move. As such, a diameter of the protrusion 410 prevents rotation of the planet shafts 310.

The technical effect of the feature is to utilize the protrusion of the differential carrier to prevent rotation thereof. By doing this, a snap ring or other additional component may be omitted, thereby decreasing manufacturing cost and complexity.

The disclosure provides support for a system including a planet carrier coupled to a differential carrier, wherein the planet carrier comprises a plurality of planet shafts including a cutout interfacing with a pilot interface of the differential carrier. A first example of the system optionally including where the cutout comprises a radial surface and an axial surface. A second example of the system, optionally including the first example, further includes where the axial surface is normal to the radial surface. A third example of the system, optionally including one or more of the previous examples, further includes where the radial surface and the axial surface are in face-sharing contact with the pilot interface. A fourth example of the system, optionally including one or more of the previous examples, further includes where the pilot interface is a protrusion extending from the differential housing. A fifth example of the system, optionally including one or more of the previous examples, further includes where the pilot interface is circular. A sixth example of the system, optionally including one or more of the previous examples, further includes where the cutout faces a central axis of the differential carrier. A seventh example of the system, optionally including one or more of the previous examples, further includes where the cutout is spaced away from a portion of a planet shaft of the planet shafts interfacing with a planet gear. An eighth example of the system, optionally including one or more of the previous examples, further includes where the plurality of planet shafts is stationary.

The disclosure provides additional support for a differential carrier assembly including a planet carrier comprising an opening surrounded by a surface, a differential carrier extending through the opening and in face-sharing contact with the surface, and a plurality of planet shafts extending from an interior of the planet carrier to the differential carrier, wherein each of the plurality of planet shafts comprises a cutout in face-sharing contact with the differential carrier. A first example of the differential carrier assembly further includes where the differential carrier comprises a pilot interface that protrudes from a body of the differential carrier and presses against the cutout. A second example of the differential carrier assembly, optionally including the first example, further includes where the differential carrier is configured to block rotation of the plurality of planet shafts. A third example of the differential carrier assembly, optionally including one or more of the previous examples, further includes where the cutout comprises a radial surface and an axial surface in face-sharing contact with a pilot interface of the differential carrier, and wherein the axial surface is normal to the radial surface and faces a radially inward direction. A fourth example of the differential carrier assembly, optionally including one or more of the previous examples, further includes where the cutout comprises a half-oval shape with a height less than a diameter of each of the plurality of planet shafts. A fifth example of the differential carrier assembly, optionally including one or more of the previous examples, further includes where the differential carrier is physically coupled to the planet carrier via a plurality of bolts, wherein the plurality of bolts is adjacent to a portion of the plurality of planet shafts away from the cutout.

The disclosure provides further support for an assembly including a gear set comprising a plurality of planet gears arranged on a plurality of planet shafts, a differential carrier physically coupled to a planet carrier via a plurality of bolt, wherein a pilot interface of the differential carrier is pressed against and in face-sharing contact with a cutout of each of the plurality of planet shafts. A first example of the assembly further includes where the assembly is free of a snap ring. A second example of the assembly, optionally including the first example, further includes where the cutout is step cut into an extreme end of each of the plurality of planet shafts. A third example of the assembly, optionally including one or more of the previous examples, further includes where the cutout is spaced away from the plurality of planet gears. A fourth example of the assembly, optionally including one or more of the previous examples, further includes where the plurality of planet shafts is stationary due to only a force applied by the pilot interface.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
    a planet carrier coupled to a differential carrier, wherein the planet carrier comprises a plurality of planet shafts including a cutout comprising a radial surface and an axial surface in face-sharing contact with a pilot interface of the differential carrier.

2. The system of claim 1, wherein the axial surface is normal to the radial surface.
3. The system of claim 1, wherein the pilot interface is a protrusion extending from the differential housing.
4. The system of claim 1, wherein the pilot interface is circular.
5. The system of claim 1, wherein the cutout faces a central axis of the differential carrier.
6. The system of claim 1, wherein the cutout is spaced away from a portion of a planet shaft of the planet shafts interfacing with a planet gear.
7. The system of claim 1, wherein the plurality of planet shafts is stationary.
8. A differential carrier assembly, comprising:
    a planet carrier comprising an opening surrounded by a surface;
    a differential carrier extending through the opening and in face-sharing contact with the surface; and
    a plurality of planet shafts extending from an interior of the planet carrier to the differential carrier, wherein each of the plurality of planet shafts comprises a cutout having a radial surface and an axial surface in face-sharing contact with the differential carrier.
9. The differential carrier assembly of claim 8, wherein the differential carrier comprises a pilot interface that protrudes from a body of the differential carrier and presses against the cutout.
10. The differential carrier assembly of claim 8, wherein the differential carrier is configured to block rotation of the plurality of planet shafts.
11. The differential carrier assembly of claim 8, wherein the cutout comprises a radial surface and an axial surface in face-sharing contact with a pilot interface of the differential carrier, and wherein the axial surface is normal to the radial surface and faces a radially inward direction.
12. The differential carrier assembly of claim 8, wherein the cutout comprises a half-oval shape with a height less than a diameter of each of the plurality of planet shafts.
13. The differential carrier assembly of claim 8, wherein the differential carrier is physically coupled to the planet carrier via a plurality of bolts, wherein the plurality of bolts is adjacent to a portion of the plurality of planet shafts away from the cutout.
14. An assembly, comprising:
    a gear set comprising a plurality of planet gears arranged on a plurality of planet shafts;
    a differential carrier physically coupled to a planet carrier via a plurality of bolts, wherein a pilot interface of the differential carrier is pressed against and in face-sharing contact with a radial surface and an axial surface of a cutout of each of the plurality of planet shafts.
15. The assembly of claim 14, wherein the assembly is free of a snap ring.
16. The assembly of claim 14, wherein the cutout is step cut into an extreme end of each of the plurality of planet shafts.
17. The assembly of claim 14, wherein the cutout is spaced away from the plurality of planet gears.
18. The assembly of claim 14, wherein the plurality of planet shafts is stationary due to only a force applied by the pilot interface.

* * * * *